UNITED STATES PATENT OFFICE.

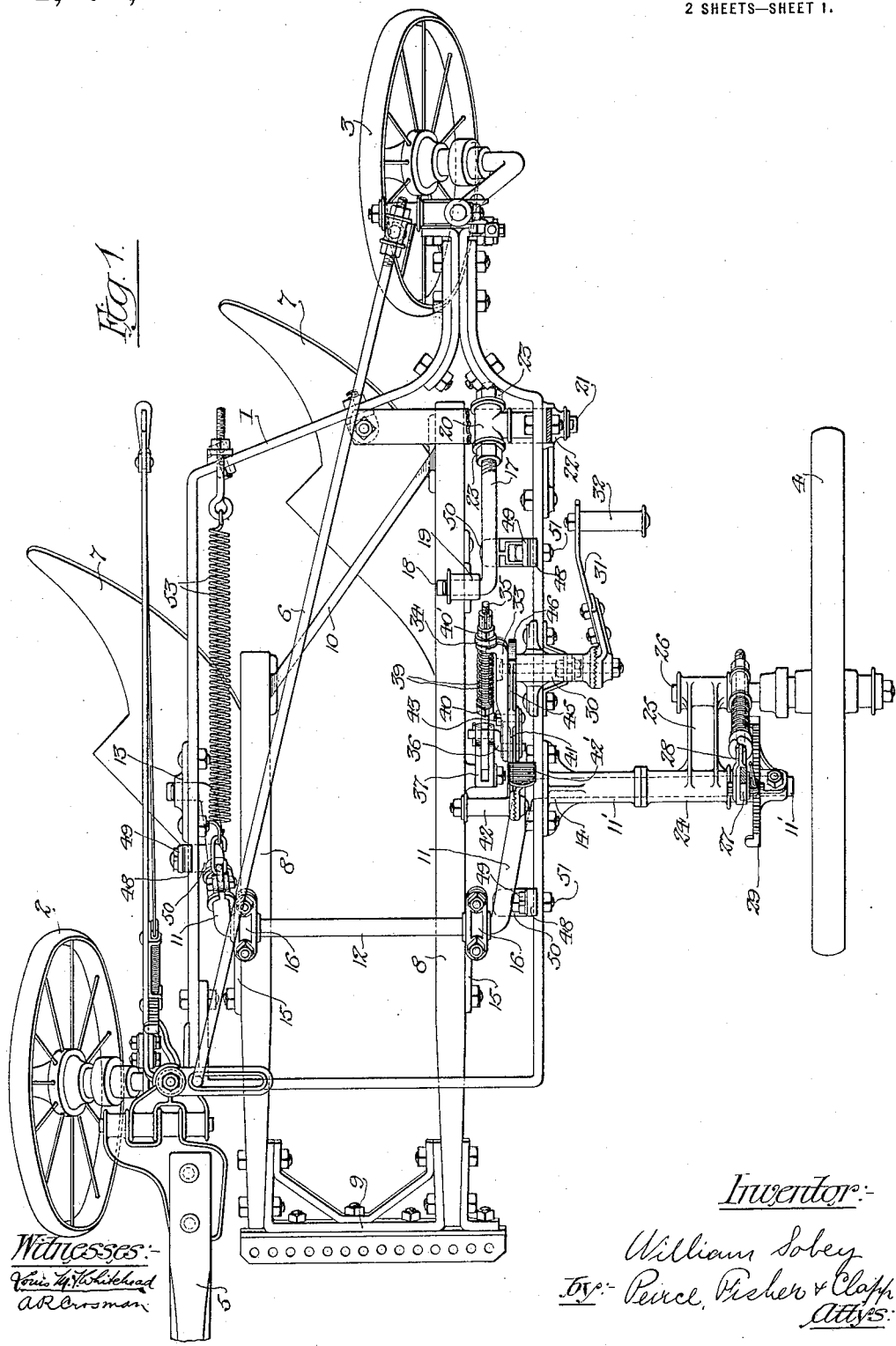

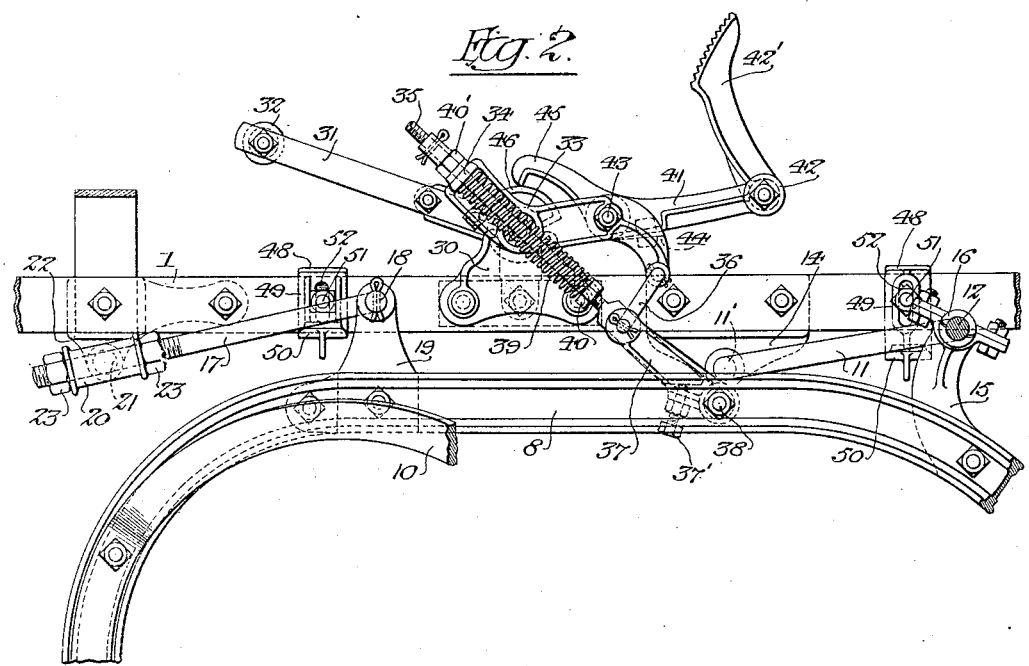
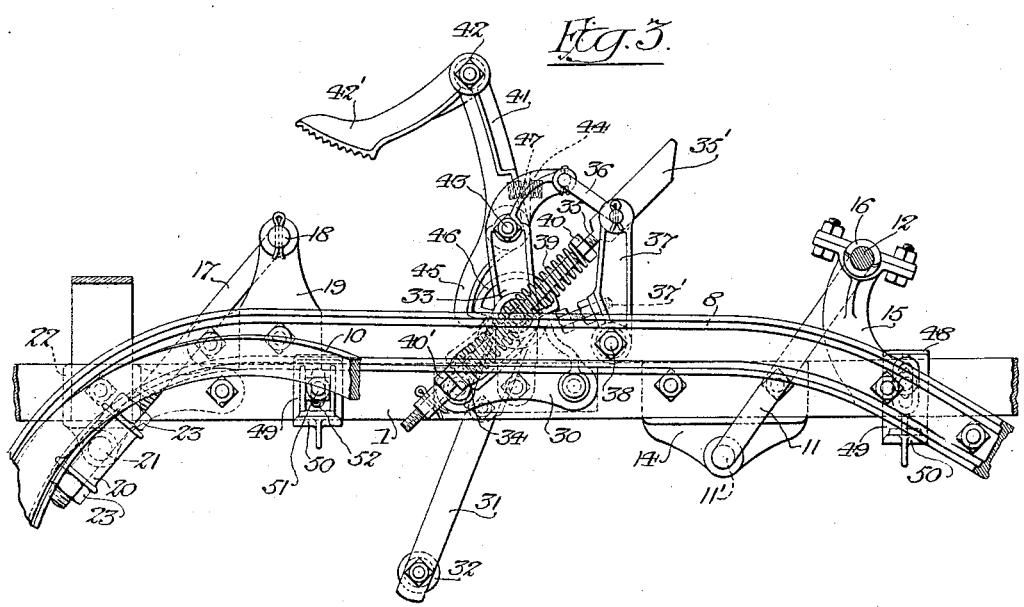

WILLIAM SOBEY, OF RACINE, WISCONSIN, ASSIGNOR TO J. I. CASE PLOW WORKS, OF RACINE, WISCONSIN, A CORPORATION.

WHEELED PLOW.

1,173,392.  Specification of Letters Patent.  Patented Feb. 29, 1916.

Original application filed April 23, 1909, Serial No. 491,833. Divided and this application filed September 12, 1914. Serial No. 861,420.

*To all whom it may concern:*

Be it known that I, WILLIAM SOBEY, a citizen of the United States, and a resident of Racine, county of Racine, and State of Wisconsin, have invented certain new and useful Improvements in Wheeled Plows, of which the following is a full, fair, and exact description.

The invention relates to wheeled plows, and more particularly to a means for supporting the plow in the frame so that it may be raised and lowered, and the invention consists in the features of improvement hereinafter set forth, illustrated in the accompanying drawings, and more particularly pointed out in the appended claims.

The present application is a division of an earlier application filed by me in the United States Patent Office April 23, 1909, Serial No. 491,833.

In the drawings, Figure 1 is a plan view of the improved plow. Figs. 2 and 3 are detail views in sectional elevation showing the plow supporting parts in their raised and lowered positions.

The drawings illustrate the present improvements as applied to a gang plow, but it will be understood that it is also applicable to a wheeled plow having but a single plow body. The frame, 1, is of usual construction and is mounted upon front and rear furrow wheels 2 and 3, and upon a land-side wheel 4. The vertical spindle of the front furrow wheel is connected to a tongue 5, and, by means of a controlling rod 6, to the spindle of the rear furrow wheel. The plow bodies 7 are mounted upon the rear ends of suitable plow beams 8 that are connected at their forward ends by a cross bar 9, and, at their rear ends, by a diagonal brace bar 10. The parts thus far described may be of any usual or suitable construction.

The plow beams are hung in the frame by means of a bail that is connected to the forward ends of the plow beams, and by means of an arm or half-bail that is connected to the rear ends of the plow beams. The bail comprises crank arms 11 and a transverse portion 12 extending between the ends of the crank arms. The crank arms 11 of the bail are journaled in suitable bearings 13 and 14 fixed to the side bars of the frame, and brackets 15, fixed to the plow beams and projecting upwardly therefrom, are provided with bearings 16 that engage the transverse portion 12 of the bail.

The arm or half-bail 17 is provided with an offset front end portion 18 journaled in the upper end of a bracket 19, that is fixed to and projects upwardly from the rear end of the left-hand plow beam 8. The rear end of the arm or half-bail 17 extends through a sleeve or hollow, T-shaped head 20 that is fixed to the inner end of a stud 21. Stud 21 is journaled, as shown, in a bracket 22 fixed to the adjacent side bar of the frame. Nuts 23 threaded upon the rear end of the arm or half-bail 17 engages the ends of the sleeve 20 and adjustably connect the arm or half-bail to the pivot or stud 21 whereon it swings. By this means the effective length of the arm or half-bail 17 may be adjusted as desired.

The bearing 14 for the crank arm 11 of the bail (as shown in Fig. 1) is extended and the bail shaft 11′ projects beyond this bearing and carries a sleeve 24 provided with an arm 25. The land-side wheel 4 is mounted on a short shaft 26 that is fixed at its inner end to the arm 25. A lever 27, loosely mounted on the end of the bail shaft 11′ is connected to the end of the arm 25 by a link 28 and a dog on this lever is arranged to engage a notched segment 29 that is fixed to the end of the bail shaft 11′. In this way the land-side wheel is adjustably connected with the bail shaft and shifts therewith as the plow is raised and lowered, to automatically level the plow frame.

The mechanism for raising and lowering the plow comprises a short shaft journaled in a bracket 30 that is fixed to and projects upwardly from the side bar of the frame on the land-side of the machine. A rearwardly extending, lifting foot lever 31 is connected with the outer end of this shaft and is provided at its rear end with an opposite foot piece 32. The arm 33 is fixed at a point intermediate its ends to the inner end of the shaft journaled in the bracket 30. One end portion of this arm is curved and extends upwardly and forwardly from the shaft or pivot and the other end extends rearwardly therefrom, as shown in Figs. 2 and 3. The rear end of the arm 33 is provided with a perforated lug 34, through which one end of the toggle link 35 extends and a connector link 36 is pivoted to the opposite ends of the arm 33 and of the toggle link 35. A second toggle link 37 is pivoted at one end to the links or rods 35 and 36, and, at its opposite ends, it is connected to the adjacent plow beam 8 by means of a pivot bolt 38. The toggle link 35 is preferably yieldingly connected to the arm 33, and for this purpose a spring 39 is coiled about the link or rod and extends between the lug 34 and a nut 40 threaded on the forward end of the link or rod 35. A nut 40' threaded on the rear end of the link or rod is arranged to engage the lug 34 and limit the movement of the toggle link relatively to the arm 33.

A depressing foot lever 41 having foot-rests 42 and 42', is connected to the arm 33 by a pivot bolt 43 and is arranged to engage an abutment 44 on the forward end of the arm 33. This foot lever is provided with a rearwardly extending hook portion 45 which, when the plow is in raised position, is arranged to engage the end of a segment 46 formed upon the bracket 30 to thereby hold the plow in raised position. A spring 47 interposed between the end of the arm 33 and the foot lever 41 tends to press the hook or latch 45 against the segment 46.

To lower the plow from the position shown in Fig. 3, the operator presses upon the foot rest 42 on the lowering foot lever 41 and thereby shifts it about its pivot 43 to disengage the latch 45 from the segment 46. The foot lever then engages the outer end of the arm 33, and continued pressure upon the foot-piece 42 moves the plow into the ground and the toggle links 35 and 37 in straight line position. This movement is limited by engagement of the extended end portion 35' of the toggle link 35 with a stop bolt 37', which is adjustably mounted on the toggle link 37. The reverse movement of the parts to raise the plow is effected by pressing on the foot-piece 32 of the lifting foot lever 31. This lift mechanism is claimed in the original application Serial No. 491,833 above referred to, and other lift mechanism could be substituted therefor without departure from the present invention.

The crank arms 11 of the front plow supporting bail are considerably shorter than the rear supporting arm or half-bail 17, and the lift mechanism is connected to the plow beam at a point nearer to the front bail than it is to the rear arm. By this arrangement a differential movement will be given to the plow beams and plow bodies as they are raised and lowered, so that the points of the plows will be depressed in advance of the heels thereof, in lowering the plows from their raised position, and the plow points will be lifted in advance of the heels, in starting the plow from working position. In this way, the plows will enter and leave the ground point first, so that the draft of the team will aid both in putting the plows into the ground and in lifting them therefrom. By adjusting the nuts 23 on the arm or half-bail 17, the effective length of this arm or the distance between its pivot point and connection with the plow, can be adjusted to give the desired tip to the plow bodies in raising and lowering the same.

Stops are provided for limiting the downward movement of the supporting bail and arm, and for holding the plows in working position. Two of these stops are arranged on the opposite side bars of the frame for engaging the crank arms 11 of the bail, and another stop is arranged on the land-side bar of the frame for engaging the arm on the half-bail 17. Each of these stops comprises a part 48 which fits over the side bar of the frame and is provided with lugs overlapping the edges thereof and an L-shaped piece 49 that is adjustable on the part 48 and is provided with an inwardly projecting stop lug 50 for engagement either with the crank arms of the bail or with the arm 17. Stop pieces 48 and 49 are held in position upon the side bars by bolts 51 extending therethrough, and the parts 49 are provided with vertical slots 52 through which the bolts 51 extend, so that the stop lugs 50 may be adjusted vertically to hold the plow in the desired position when it is in the ground. A lift spring 53 is connected at its forward ends to one of the crank arms 11 of the bail, and at its rear end to the rear portion of the frame 1.

It is obvious that numerous changes may be made in the details set forth without departure from the essentials of the invention as defined in the claims.

I claim as my invention:

1. In a wheeled plow, the combination with a wheel of front and rear bails journaled on a frame, a plow hung on said bails, means for raising and lowering the plow and means for adjusting the effective length of one of said bails, substantially as described.

2. In a wheeled plow the combination with a frame of front and rear bails journaled on the frame, a plow hung on said bails, and means for adjusting the effective length of said rear bail, substantially as described.

3. In a wheeled plow, the combination with the frame, of a front bail and a rear half-bail or arm, journaled on the frame, a plow hung on said bail and said arm, and means for raising and lowering the plow connected thereto adjacent said front bail, substantially as described.

4. In a wheeled plow, the combination with a frame of a front bail and a rear half-bail or arm journaled on the frame, a plow hung on said bail and on said arm, means for adjusting the effective length of said arm, and means for raising and lowering said plow, substantially as described.

5. In a wheeled plow, the combination with a frame, of a front bail journaled at its rear end on said frame, a plow hung on the forward part of said bail, a guiding arm pivotally connected at its forward end to the rear end of the plow beam and pivotally connected at its rear end to said frame, said arm being longer than the crank arms of said bail, and raising and lowering means interposed between said frame and the plow and being connected to the plow at a point adjacent said front bail.

6. In a wheeled plow, the combination with a frame, of a front bail journaled on the frame, a plow hung on said bail, an arm pivotally connected to the rear end of the plow beam, said arm being longer than the crank arms of said bail, and a part journaled on the rear portion of said frame to which said arm is adjustably connected, substantially as described.

7. In a wheeled plow, the combination with a frame of a front bail journaled on the frame, a plow hung on said bail, an arm pivotally connected to the rear end of the plow bottom, a stud journaled on the rear end of said frame and having a head through which said arm extends, and nuts threaded on said arm and engaging the ends of said head, substantially as described.

8. In a wheeled plow, the combination with a frame of a front bail and a longer rear bail journaled on the frame, a plow hung on said bails, means for adjusting the effective length of said rear bail, adjustable stops on the frame for engaging said bails when the plow is lowered, and means for raising and lowering the plow, substantially as described.

WILLIAM SOBEY.

Witnesses:
Harry L. Smith,
Stanley A. Brewer.

Copies of this patent may be obtained for five cents each, by addressing the "Commissioner of Patents, Washington, D. C."